United States Patent

[11] 3,595,201

[72] Inventor Theodorus Antonio Gerardo Oudenhoven Vita Dumas, 499 Punta Chica, Partido San Fernando, Buenos Aires, Argentina
[21] Appl. No. 867,705
[22] Filed Oct. 20, 1969
[45] Patented July 27, 1971

[54] DEVICE APPROPRIATE FOR THE IDENTIFICATION OF ANIMALS
2 Claims, 5 Drawing Figs.

[52] U.S. Cl. .................................................. 116/114, 24/90, 24/108, 40/301
[51] Int. Cl. ................................................ G01d 21/00
[50] Field of Search........................... 116/114; 40/300, 301, 302; 24/217, 90, 245, 108; 85/37, 38, 39

[56] References Cited
UNITED STATES PATENTS

| | | | |
|---|---|---|---|
| Re. 23,624 | 2/1953 | Sutin | 24/90 |
| 2,901,796 | 9/1959 | Hope | 24/90 UX |
| 2,940,199 | 6/1960 | Goldberg | 40/301 |
| 3,237,904 | 3/1966 | Abruzese | 24/245 X |
| 3,388,492 | 6/1968 | Nichols, Jr. | 40/301 |

FOREIGN PATENTS

| 1,404,528 | 5/1965 | France | 24/90 |
|---|---|---|---|

*Primary Examiner*—Louis J. Capozi
*Attorney*—Christen & Sabol

ABSTRACT: A two-part identification device to be inserted in the pierced ear of an animal comprises an elliptical deformable plastic plate having a circular opening with oppositely disposed grooves to receive another similar plastic plate having a dowel which is inserted through the animal's ear into the opening in the first plate, the tip of the dowel being spear shaped with a flat base whose margin is defined by a pair of intersecting ogive lines.

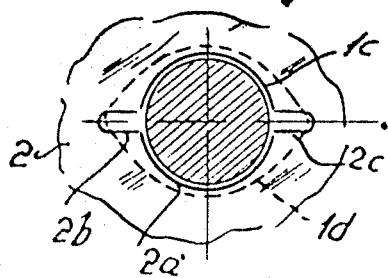
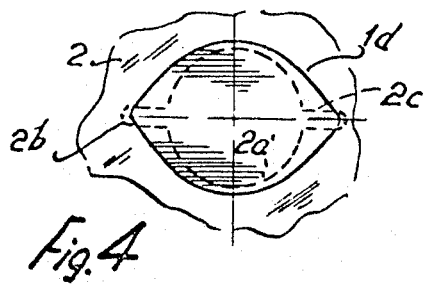
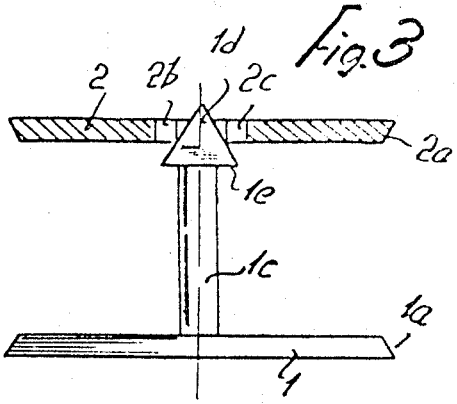
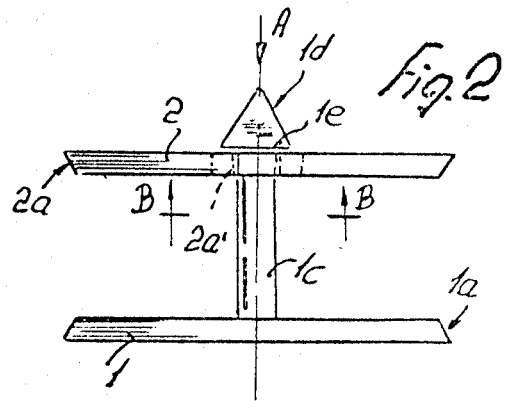
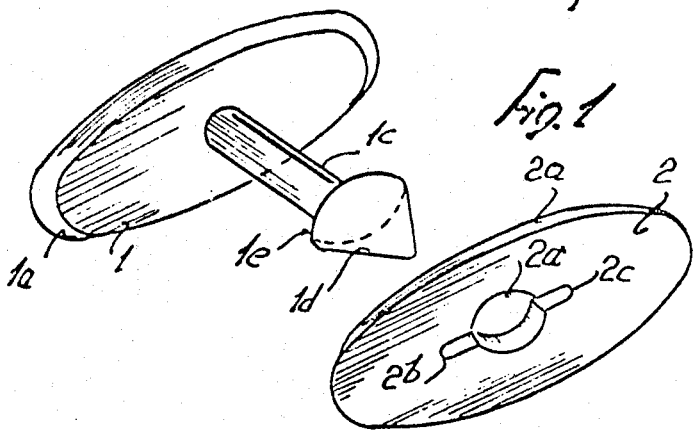

DEVICE APPROPRIATE FOR THE IDENTIFICATION OF ANIMALS

The present invention concerns a device appropriate for the identification of cattle and its principal object is to provide an embodiment of said kind in order to avoid the many difficulties in the practice and operation of the embodiments used up to the present.

The features normally found in cattle identifying elements are varied, which generally are applied to the animal's ears, but experience would indicate that the most appropriate devices are those constituted by a pair of pieces, which once applied, adjoin one another, each one of said parts possesses reciprocal locking means, and one of those pierces the animal's ear.

Precisely, in elements of this type, the difficulties appear when the interlocking means are linked. Said interlocking means do not assure an effective engagement between the component parts, and therefore sudden movements cause them to loosen and to cease performing their function in some cases, and in others to do harm to the animal.

Therefore, the object of the invention is to obtain a firm joint for the discs integrating the marking device, by means of which it becomes possible to eliminate the above-mentioned loosening of parts and to avoid inflicting harm on the animal, these being the main causes leading to the inefficiency of the said former devices.

The above purpose is obtained by means of a construction such that it can rightly be said to constitute the basic point of the invention. This construction differs from any previous embodiments so far put into practice to obtain a more effective and efficient joint between the discs which comprise the identification device.

Essentially, the principal object of the invention, in so far as its scope is concerned, is defined by the fact that the device consists of a pair of flat-faced, elliptically shaped elements. One of said members is provided at the center thereof with an integral dowel, the axis of which is perpendicular to the disc. Said pin or dowel terminates in a spearpoint shaped acuminate portion, having an ogival acuminate basis, whereas the other elliptical element is provided with a circular orifice, the diameter of which is substantially equal to that of the aforesaid dowel and smaller than that of the ogival acuminate basis of the spear-shaped point, said orifice continuing laterally in two diametrally opposite grooved areas.

This arrangement, when the dowel pierces the ear of the animal, permits the ogival basis of the spear point to interlock with the complementary elliptical element. To this end, it is necessary that the marginal area of the orifice be deformed to allow the passage of that portion of the spear point basis which has the larger area. Said deformation is possible due to the circumstance that said two transversal grooves have been provided as an extension of the circular orifice. The imaginary line of these two grooves coincides with the axis of the ogive.

The invention likewise envisages other accessory objects, as will be made clear during the course of the present description.

In order that the present invention may be more clearly understood and readily put into practice, an exemplary preferred embodiment of same will now be described with reference to the drawings attached to the description and in which FIG. 1 is a perspective view of the assembly constituting the identification device according to the present invention.

FIG. 2 is a side elevational view of the device in position of entry.

FIG. 3 is a view similar to that of FIG. 2 but in this case showing both constitutive elements according to the invention facing one another in position ready for entry.

FIG. 4 is a view following arrow A shown in FIG. 2 and

FIG. 5 is a sectional view through line B-B of FIG. 2.

Like numerals represent like or similar parts through out the several figures of the drawings.

In accordance with the embodiment shown, the device of the invention consists of a pair of elliptically shaped elements 1 and 2. The edges, 1a and 2a, of said elements are substantially chamfered, even though these shapes are not basic or fundamental to the invention, and may be varied without implying a modification of the latter.

A dowel 1c rises from the center of element 1. The axis of this dowel is perpendicular to the plane of the faces of said element. It terminates in lanceolated portion 1d which, considered in a plane, is ogival in shape, and the base 1e of which is of larger diameter than dowel 1c.

The other one of said elliptical elements 2 is also, at its center, provided with a circular orifice 2a', the diameter of which is substantially equal to the diameter of dowel 1c. Said orifice 2a' is continued in two grooves or diametrically opposite slits 2b and 2c, by means of which a certain deformability is granted to edges 2a which facilitate insertion of lanceolated portion 1d but which prevent its extraction, unless great strength be applied for that purpose, such as could be obtained only by means of manual intervention of a kind exceptional in such an insertion. The axis of the ogive must be in line with both grooves 2c—2b.

As illustrated in FIG. 3, the dowel is made to pass through an orifice in the ear of the animal, said dowel being then confronted with the second disc-shaped element 2. Pressure is now exerted on both, as indicated by arrows shown in FIG. 3. Through this action, lanceolated portion 1d is made to pass through orifice 2a' until the component parts are situated in the reciprocal position illustrated in FIG. 2.

FIGS. 4 and 5 show how the component parts are secured owing to the insertion of the lanceolated portion into the corresponding orifice, and how said portion permits a very safe joint to be obtained to avoid the untimely release of both elements.

The invention as described and illustrated may be clearly understood and further explanations will not be required by those versed in the art.

It is evident that sundry alterations as to construction and detail may be made without departing from the scope of the present invention, as clearly determined in the following claims.

Having thus particularly described and determined the nature of the present invention and the manner in which same is to be put into practice, it is declared that what I claim as exclusive property and invention is:

1. A two-part device for attachment to the pierced ear of an animal for identification purposes, comprising a first flat generally elliptical plastic deformable plate member having a centrally disposed generally circular opening therein, said opening also including a pair of oppositely disposed radially outwardly extending grooves, and a second flat generally elliptical plastic plate member substantially similar to the first plate member and including a centrally disposed insertion dowel projecting transversely from one side thereof, the extremity of said dowel having a generally spear-shaped projection terminating in a base having a flat surface extending outwardly from the dowel in a plane parallel with the plate member, the margin of said base being defined by two oppositely disposed ogive lines intersecting at two points equidistantly spaced from opposite sides of the dowel, the distance between said two points being approximately equal to the length of the opening defined by the grooves in the first plate member.

2. The invention as described in claim 1, wherein the grooves in said opening in the first plate member and the two points of intersection of the ogival curves defining the base of the projection in the second plate member are all disposed in a common plane coinciding with the longer axes of the respective first and second plate members.